April 1, 1947.   L. D. FLETCHER   2,418,113
ICE CREAM DISPENSING CABINET
Filed April 10, 1944
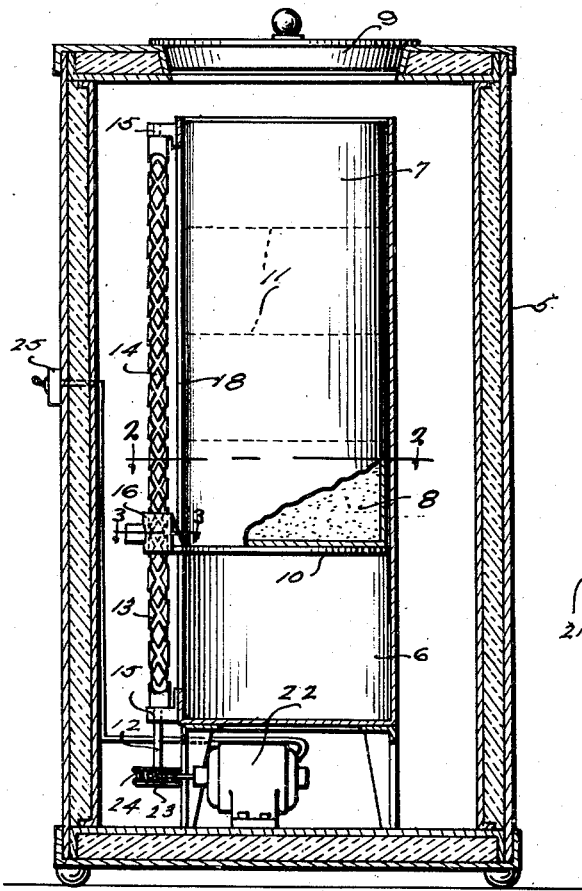
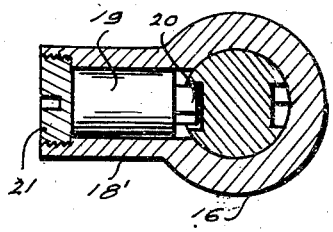
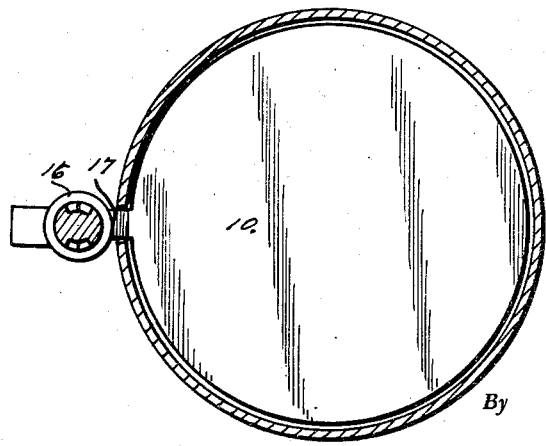
Inventor
Lawrence D. Fletcher,
By Clarence A. O'Brien
and Harvey B. Jacobson
Attorneys Patented Apr. 1, 1947

2,418,113

UNITED STATES PATENT OFFICE 2,418,113

ICE CREAM DISPENSING CABINET

Lawrence D. Fletcher, Lansing, Mich., assignor of one-half to William Nelson Calhoun, Lansing, Mich.

Application April 10, 1944, Serial No. 530,441

1 Claim. (Cl. 220—14)

This invention relates to dispensing cabinets for ice cream and the like, such as are commonly used in stores, particularly at soda fountains.

An ordinary ice cream dispensing cabinet includes an outer heat insulated casing within which is disposed a metallic can adapted to receive a cardboard ice cream-containing can, the casing having a top lid registered with the metallic can and adapted to be removed to facilitate scooping of the ice cream from the cardboard can from time to time when required, the casing containing or being adapted to receive suitable refrigerating means whereby the ice cream is maintained in a properly congealed condition. In using the ordinary cabinet, it is necessary to bend over considerably and reach deeply into the cans to scoop the ice cream therefrom after the supply of ice cream is somewhat reduced. Besides entailing considerable time and labor, this creates a somewhat unsanitary condition.

The primary object of the present invention, therefore, is to overcome the abovementioned difficulties and objections by providing the metallic can with a reciprocable follower plate upon which the cardboard ice cream-containing can may be placed, and providing conveniently operable means for reciprocating the follower plate which is operable to vertically adjust the latter and thereby elevate the cardboard can to maintain the surface of its contents substantially at the top of the metallic can as the level of the ice cream lowers. In this way, the ice cream may be more readily and expeditiously dispensed in a more sanitary manner.

Other objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a vertical transverse sectional view of an ice cream dispensing cabinet embodying the present invention.

Figure 2 is an enlarged horizontal section taken on line 2—2 of Figure 1, with the casing of the cabinet omitted.

Figure 3 is an enlarged fragmentary horizontal section taken on the plane of line 3—3 of Figure 1.

Referring more in detail to the drawings, 5 indicates the heat insulated cabinet casing which may be of any generally well known form and construction. Disposed within this casing is a metallic can 6 that is adapted to receive a cardboard can 7 in which the ice cream or like frozen product is packed. The casing 5 has a top opening closed by a removable lid 9 and registered with the can 6 so that the lid may be removed from time to time to gain access to the ice cream or the like in the can 7. As usual, the casing 5 contains, or is adapted to receive, a refrigerating means whereby the ice cream or the like is maintained in a properly congealed condition.

In accordance with the present invention, a horizontal vertically reciprocable follower plate 10 is fitted slidably in the metallic can 6 to receive the cardboard ice cream-containing can 7 thereon. Also, means is provided for reciprocating the follower plate 10 which is operable to vertically adjust said follower and thereby maintain the surface of the ice cream substantially level with the top of the metallic can 6. The portion of the cardboard can 7 which projects above the can 6 may be removed, and said can 7 may be weakened or perforated at different elevations, as at 11, to facilitate this.

In the embodiment shown, the reciprocating means for the follower plate 10 consists of a vertical rotary shaft 12 having a relatively large cylindrical portion 13 provided with crossing right and left hand spiral grooves, as at 14, that communicate with each other at opposite ends of the shaft portion 13. The shaft 12 is journaled in suitable bearings 15 so as to be disposed vertically at one side of the can 6 and to extend from top to bottom of the latter. Slidable on the grooved portion of shaft 12 is a sleeve 16 fixed on the outer end of an arm 17 rigid with and projecting outwardly from the follower plate 10 through a vertical slot 18 provided in the adjacent side of the can 6 and extending substantially from top to bottom of the latter. The sleeve 16 has a lateral hollow boss 18' within which is rotatably fitted a pin 19 having a reduced inner end 20 engaging a groove 14, pin 19 being retained in the boss 18' by means of a removable threaded closure plug 21. Thus, upon rotation of shaft 12, the follower 10 will be reciprocated automatically, the pin end 20 passing from one groove 14 to the other at opposite ends of the shaft portion 13 in a manner well known in the arts. Of course, when the pin 19 engages one groove, the follower plate 10 is moved upwardly, and when the follower plate reaches its upper limit of movement, the pin 19 passes into the other groove 14 and causes the follower plate to lower. Such a reciprocating mechanism has been commonly employed in the arts of fishing reels and windshield wipers for respectively moving the thread-traversing arm of the fishing reel and for reciprocating the wiper element of a windshield wiper. Accordingly, it is unnecessary to disclose or describe in more detail this reciprocating means for the follower plate 10. Shaft 12 may be rotated by any suitable means, but as shown, an electric motor 22 is provided for this purpose. The motor 22 is mounted in the casing 5 beneath the can 6 and has a worm 23 on its armature shaft meshing with a worm gear 24 on the lower end of shaft 12. Motor 22 may be controlled by a suitable switch 25 mounted on the outside of the cabinet casing 5.

In operation, switch 25 is actuated to render the motor 22 operative, thereby rotating shaft 12 and causing the follower plate 10 to move upwardly. When the follower plate has reached the desired elevation to bring the surface of the ice cream in can 7 substantially level with the top of can 6, switch 25 is operated to throw the motor 22 out of operation. This is repeated from time to time as found necessary until the follower plate 10 is completely elevated and the contents of can 7 are completely dispensed. In this way, the ice cream is always kept within convenient reach so that it may be easily and expeditiously dispensed without requiring the clerk to bend over excessively or to reach into the cans. After the follower plate 10 has reached its upward limit of movement, further operation of motor 22 will cause said follower plate to lower so as to condition the device for the reception of another completely filled cardboard ice cream-containing can.

From the foregoing description, it is believed that the construction and operation, as well as the advantages of the present invention, will be readily understood and appreciated by those skilled in the art.

What I claim is:

In an ice cream dispensing cabinet, the combination of a can container provided with supporting legs and having a vertical slot through one side thereof, said slot extending substantially from top to bottom of the container, a vertical rotary shaft journaled on the outside of said container at said slot, said shaft having right and left spiral grooves therein which communicate with each other at their opposite ends adjacent the ends of said slot, a vertically reciprocable follower plate within the container, an arm rigid with the follower plate and freely projecting outwardly through said slot, a sleeve slidable on said shaft and fixed to said arm, a pin carried by said sleeve and engaged in a groove of the shaft, and a uni-directional driving motor mounted beneath the container and geared to the lower end of said shaft.

LAWRENCE D. FLETCHER.

REFERENCES CITED

The following references are of record in the file of this patent:

UNITED STATES PATENTS

| Number | Name | Date |
| --- | --- | --- |
| 1,773,070 | Willauer | Aug. 12, 1930 |
| 360,646 | Baynes et al. | Apr. 5, 1887 |
| 631,508 | Lang | Aug. 22, 1899 |
| 920,191 | Seymour | May 4, 1909 |
| 891,457 | Bouscal | June 23, 1908 |
| 1,849,348 | Davis | Mar. 15, 1932 |